(12) United States Patent
Singh et al.

(10) Patent No.: US 9,176,807 B2
(45) Date of Patent: Nov. 3, 2015

(54) RANDOM EVENT CAPTURING MECHANISM FOR APPLICATION SYSTEMS

(71) Applicant: Cellco Partnership, Basking Ridge, NJ (US)

(72) Inventors: Shivinder Singh, Woodbury, MN (US); Sojan Joseph, Irvine, CA (US); Krishna Reddy, Irvine, CA (US)

(73) Assignee: Cellco Partnership, Basking Ridge, NJ (US)

( * ) Notice: Subject to any disclaimer, the term of this patent is extended or adjusted under 35 U.S.C. 154(b) by 198 days.

(21) Appl. No.: 13/938,885

(22) Filed: Jul. 10, 2013

(65) Prior Publication Data

US 2015/0019913 A1    Jan. 15, 2015

(51) Int. Cl.
*G06F 11/00* (2006.01)
*G06F 11/07* (2006.01)
*H04L 12/24* (2006.01)
*G06F 11/22* (2006.01)

(52) U.S. Cl.
CPC .......... *G06F 11/079* (2013.01); *G06F 11/2257* (2013.01); *H04L 41/0631* (2013.01)

(58) Field of Classification Search
CPC .............. G06F 11/079; G06F 11/0709; G06F 11/2257; G06F 11/30; G06F 11/3006; G06F 11/3055; H04L 41/0631; H04L 41/064; H04L 41/065

USPC ............ 714/26, 25, 27, 33, 37, 38.1, 47.1, 48
See application file for complete search history.

(56) References Cited

U.S. PATENT DOCUMENTS

| | | | | |
|---|---|---|---|---|
| 6,862,698 | B1 * | 3/2005 | Shyu ............................... | 714/57 |
| 7,535,349 | B2 * | 5/2009 | Shneyder et al. ............. | 340/506 |
| 8,938,650 | B2 * | 1/2015 | Tanaka ............................ | 714/57 |
| 2002/0083371 | A1 * | 6/2002 | Ramanathan et al. .......... | 714/37 |
| 2004/0230868 | A1 * | 11/2004 | Sabet et al. ..................... | 714/25 |
| 2012/0072782 | A1 * | 3/2012 | Hughes et al. .................. | 714/57 |

* cited by examiner

*Primary Examiner* — Joseph D Manoskey

(57) ABSTRACT

A device may receive a first alert from a first technology layer of an information technology system. The first alert may be associated with an occurrence of a first event within the first technology layer. The device may receive a second alert from a second, different technology layer of the information technology system. The second alert may be associated with an occurrence of a second event within the second technology layer. The device may determine that the first alert is related to the second alert. The device may generate, based on the first alert being related to the second alert, a third alert that includes information associated with the first alert and information associated with the second alert. The device may provide the third alert to at least one of the first technology layer or the second technology layer.

20 Claims, 13 Drawing Sheets

| CLASSIFICATION 610 | DATE/TIME 620 | TECHNOLOGY LAYER 630 | ALERT 640 |
|---|---|---|---|
| PROCESS1 | 2/28/2013 00:30 | NETWORK | NETWORK EVENT |
| PROCESS1 | 2/28/2013 00:45 | APPLICATION | APPLICATION EVENT1 |
| PROCESS1 | 2/28/2013 01:03 | APPLICATION | APPLICATION EVENT2 |
| PROCESS1 | 2/28/2013 01:07 | HARDWARE | HARDWARE EVENT1 |
| APPLICATION1 | 2/27/2013 23:51 | DATABASE | DATABASE EVENT |
| APPLICATION1 | 2/28/2013 00:11 | PRESENTATION | PRESENTATION EVENT |
| DEVICE1 | 2/27/2013 23:44 | HARDWARE | HARDWARE EVENT2 |

FIG. 6

RANDOM EVENT CAPTURING MECHANISM FOR APPLICATION SYSTEMS

BACKGROUND

An organization may include an information technology (IT) system for providing a service, such as, for example, a web site, to its customers. The IT system may include numerous servers, databases, network routers, web servers, load balancers, etc., located in multiple data centers, which serve to provide the web site. The performance of the web site may determine customer satisfaction and may empower the organization to provide customers with additional services thereby increasing the importance of minimizing the amount of time required to resolve issues occurring within the IT system.

BRIEF DESCRIPTION OF THE DRAWINGS

FIG. 6 is a diagram of an example data structure that may store alert-related data;

DETAILED DESCRIPTION

The following detailed description refers to the accompanying drawings. The same reference numbers in different drawings may identify the same or similar elements.

An IT system may include groups of devices arranged in stacks of technology layers. For example, an IT system may be based on an Open Systems Interconnection (OSI) model and may include an application layer, a presentation layer, a session layer, a transportation layer, a network layer, a data link layer, and/or a physical layer. Rapid development in the field of IT and related technologies has resulted in growth in each of the technology layers of the IT system. With the growth in each of the technology layers, the complexity and time for resolving an outage and ensuring business continuity has significantly increased.

Each technology layer may be configured as an independent layer that runs as a set of stand-alone devices included within the IT system. Each technology layer may include a device that gathers specific performance statistics and/or includes tools and/or applications for monitoring the technology layer. Upon detection of an occurrence of an event (e.g., an outage, a failure of a device included in the technology layer, etc.), the device may generate an alert that is stored in a log file (e.g., a data structure) and/or provided to a user tasked with maintaining and/or correcting issues for a particular technology layer. However, due to each technology layer being configured as an independent layer, the user may not have access to information regarding occurrences of other events in other technology layers that may be necessary for determining the appropriate corrective action to be taken regarding the occurrence of the event.

Systems and/or methods described herein may capture alerts generated in response to events occurring within multiple technology layers of an IT system. The systems and/or methods may categorize the alerts and/or group related alerts. The categorized and/or grouped alerts may be published in a manner that allows for tracing, in a chronological order and through the multiple technology layers, a sequence of events resulting in a particular alert being generated.

Figure 1A:
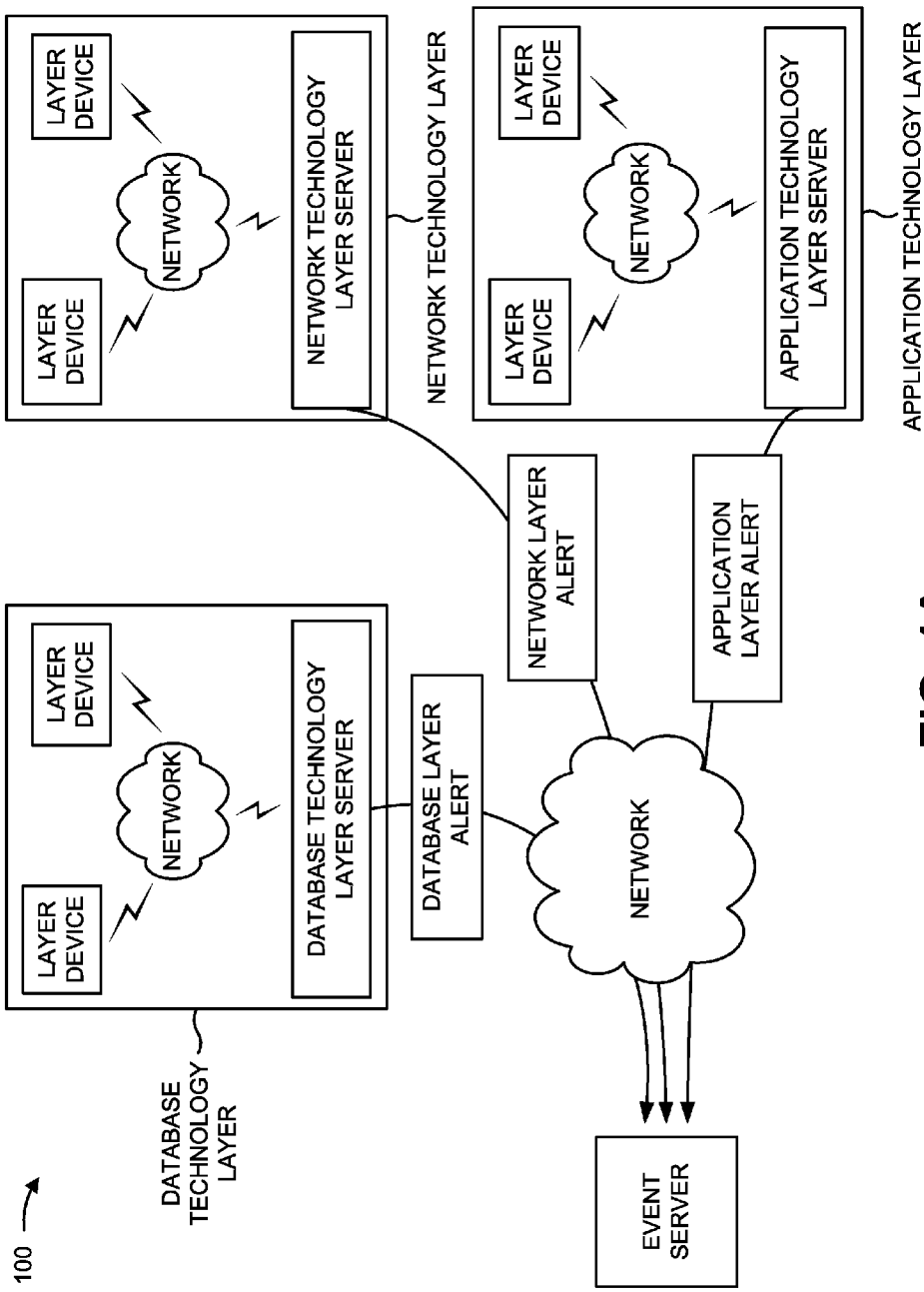
FIGS. 1A and 1B are diagrams illustrating an overview of an example implementation described herein.
Figure 1B:
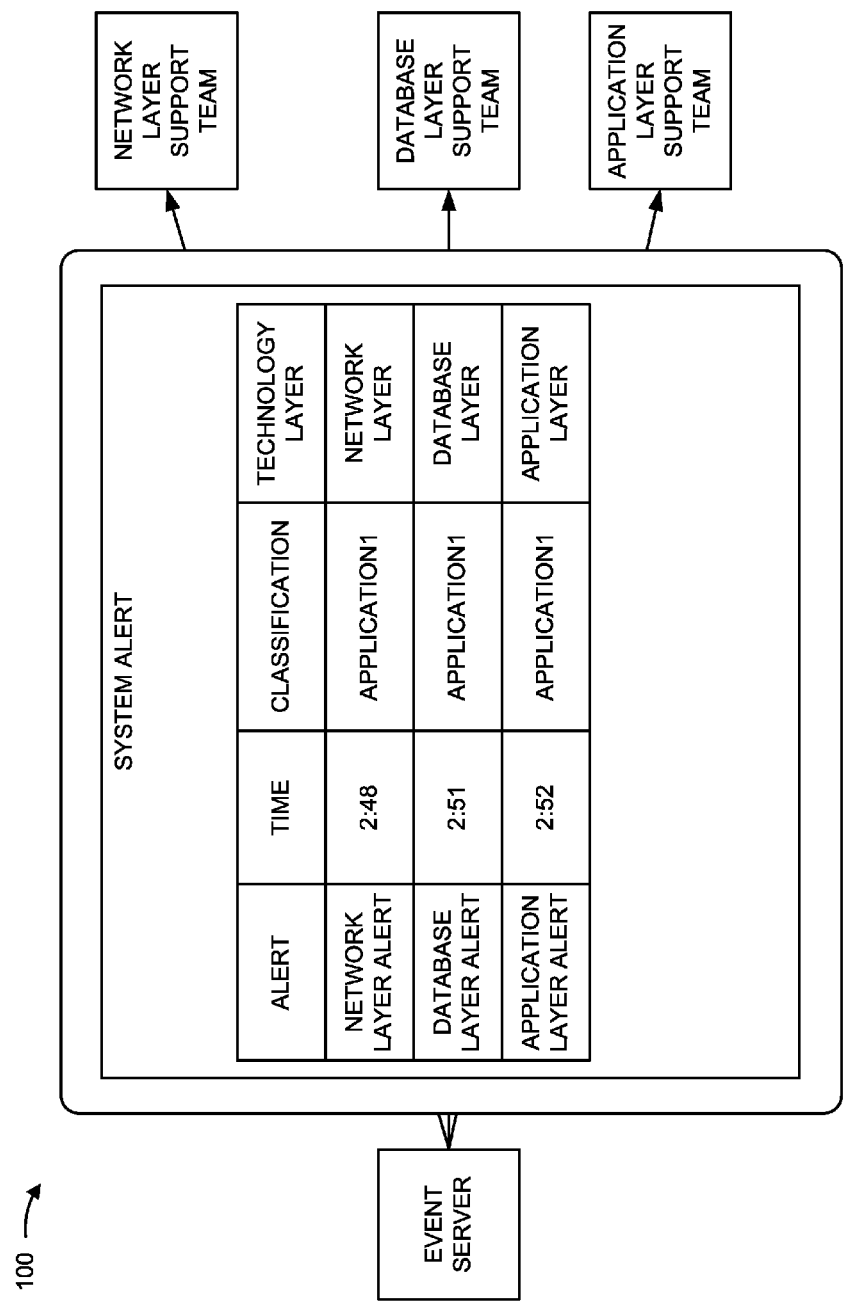

FIGS. 1A and 1B are diagrams illustrating an overview 100 of an example implementation described herein. For overview 100, assume that an IT system includes multiple devices for implementing an application ("Application1") and that the multiple devices are arranged in multiple, different technology layers. Further, assume that multiple technology layers each determine an occurrence of an event within the respective technology layer and each generate a corresponding alert. Referring now to FIG. 1A, each of the technology layers may send the alert to an event server. As shown in FIG. 1A, the IT system includes a database layer that sends a database layer alert to the event server, an application layer that sends an application layer alert to the event server, and a network layer that sends a network layer alert to the event server.

Referring now to FIG. 1B, the event server may receive the alerts from the technology layers. The event server may analyze the alerts to determine a classification associated with each of the alerts. The classification may be based on a device, an application, a system, a process, etc. related to and/or associated with each of the alerts. For example 100, the event server may analyze the database layer alert, the network layer alert, and the application layer alert and may determine that each of the alerts is related to Application1. The event server may generate a system alert that includes groupings of alerts having the same and/or related classifications. As shown in FIG. 1B, the system alert lists the network layer alert, the database layer alert, and the application layer alert in a single grouping of alerts based on the alerts being classified as relating to Application1. The event server may send the system alert to support teams associated with each of the technology layers. The system alert may provide a centralized view based on which the support teams can narrow down troubleshooting the IT system to a particular point in time and/or a particular technology layer within the IT system, thus, reducing an amount of time required to identify a root cause of an issue and/or eliminate a source of failure within the IT system. The system alert thus encapsulates all of the alerts in a single centralized display.

Figure 2:
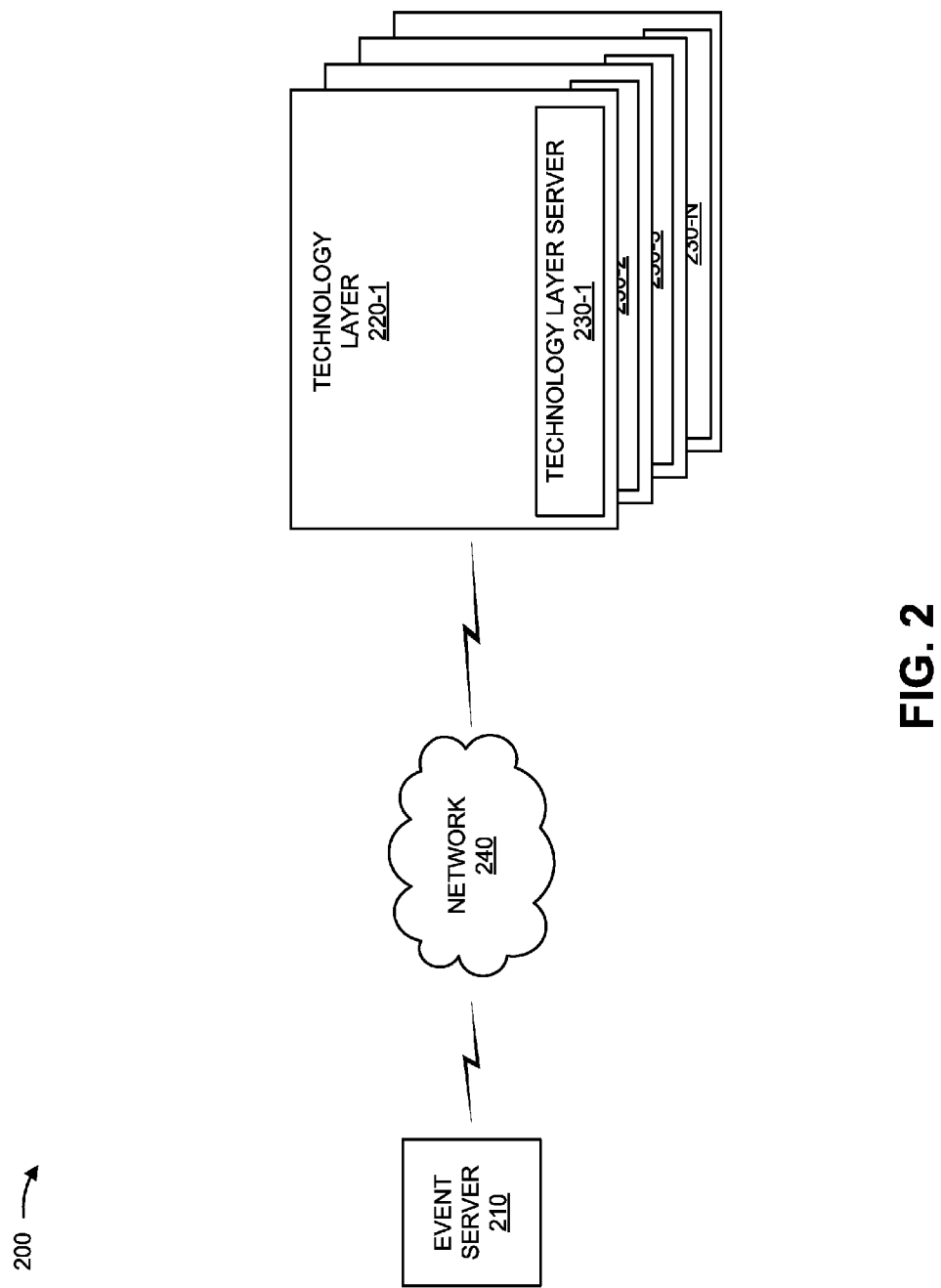
FIG. 2 is a diagram illustrating an example environment in which systems and/or methods described herein may be implemented.

FIG. 2 is a diagram illustrating an example environment 200 in which systems and/or methods described herein may be implemented. Environment 200 may include an event server 210 connected to multiple technology layers 220-1 through 220-N (referred to herein collectively as technology layers 220 and individually as technology layer 220) and/or technology layer servers 230 (referred to herein collectively as technology layer servers 230 and individually as technology layer server 230) via a network 240.

Event server 210 may include a server device that captures alerts generated within each of the technology layers 220. Event server 210 may classify and group related alerts for determining a source event of a critical alert.

Technology layer 220 may include one or more devices for implementing a particular function within an IT system. For example, technology layer 220 may include a host layer, a media layer, a network layer, a database layer, an application layer, a presentation layer, a session layer, a transport layer, a data link layer, a hardware or physical layer, or the like.

Technology layer server 230 may include a server device that gathers specific performance statistics and/or includes tools and/or applications for monitoring a particular technology layer 220. Upon detection of an occurrence of an event (e.g., an outage, a failure of a device included in technology layer 220, etc.) technology layer server 230 may generate an alert associated with the occurrence of the event. Technology layer server 230 may provide the alert through network 240 to event server 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Although FIG. 2 shows example components of environment 200, in some implementations, environment 200 may include fewer components, different components, differently arranged components, or additional components than those depicted in FIG. 2. In some implementations, one or more components of environment 200 may perform one or more tasks described as being performed by one or more other components of environment 200.

Figure 3:
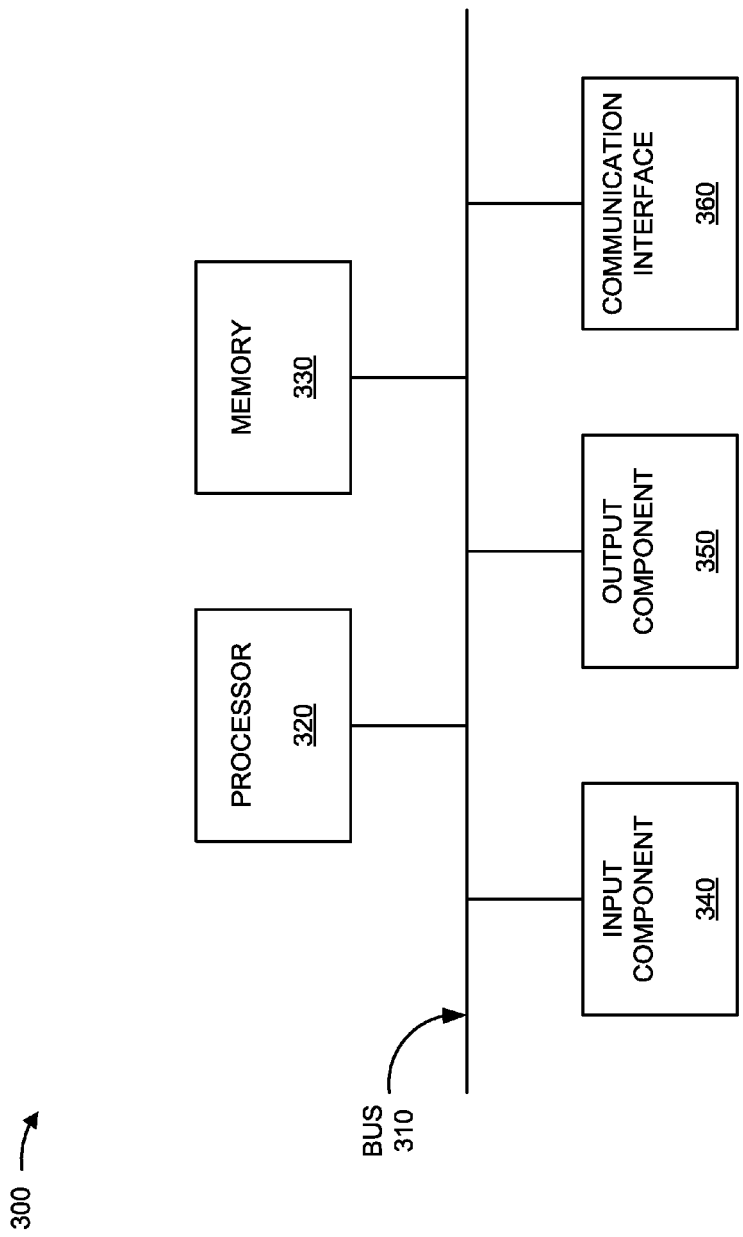
FIG. 3 is a diagram illustrating example components of a device that may be used within the environment described in FIG. 2.

FIG. 3 is a diagram illustrating example components of a device 300 that may be used within environment 200. Device 300 may correspond to event server 210 and/or technology layer server 230. Additionally, or alternatively, each of event server 210 and/or technology layer server 230 may include one or more devices 300 and/or one or more components of device 300. As shown in FIG. 3, device 300 may include bus 310, processor 320, memory 330, input device 340, output device 350, and communication interface 360.

Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a component that permits an operator to input information to device 300, such as a control button, a keyboard, a keypad, a touch screen interface, a microphone, a camera, a video recorder, or another type of input device. Output device 350 may include a component that outputs information to the operator, such as a light emitting diode (LED), a display, a speaker, or another type of output device. Communication interface 360 may include any transceiver-like component that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
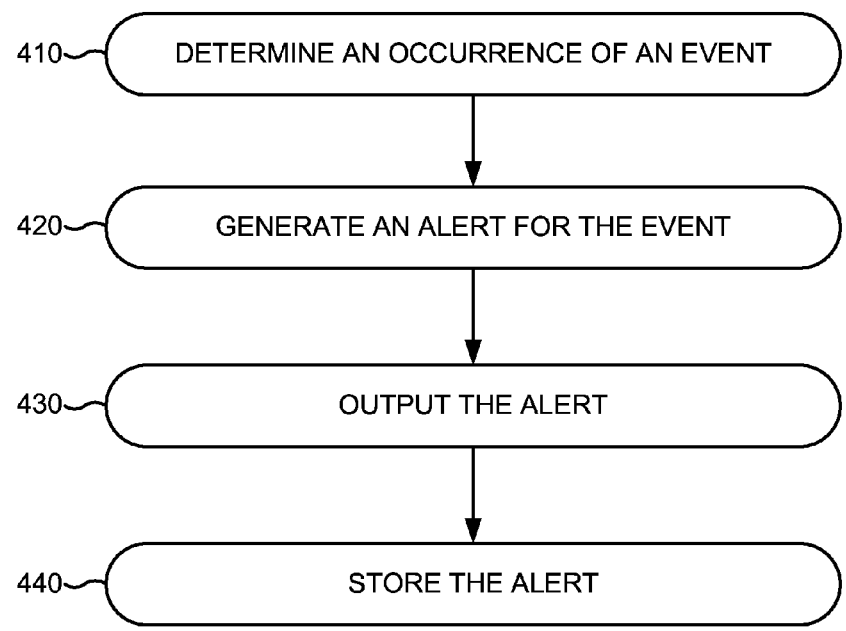
FIG. 4 is a flow chart of an example process for generating an alert.

FIG. 4 is a flow chart of an example process 400 for capturing event related information. In some implementations, process 400 may be performed by technology layer server 230. In some implementations, process 400 may be performed by one or more other devices instead of, or possibly in conjunction with, technology layer server 230.

Process 400 may include determining an occurrence of an event (block 410). For example, technology layer server 230 may monitor a performance and/or operation of a particular technology layer 220 within an IT system that is associated with technology layer server 230. Technology layer server 230 may gather information (e.g., statistics, metrics, etc.) related to the performance and/or the operation of technology layer 220. For example, technology layer server 230 may gather information regarding an amount of user traffic associated with a web site, information regarding a utilization of processors used to provide a service (e.g., a web application, web site functionality, etc.), information regarding input/output related latency, information related to identifying an occurrence of a denial of service attack, information regarding query behavior associated with accessing a particular database, etc.

Technology layer server 230 may analyze the information and may determine that an event has occurred within technology layer 220. The event may translate to a point in time when a particular, unexpected circumstance, that may lead to an undesirable result and/or an undesirable consequence, is present within technology layer 220. For example, technology layer server 230 may analyze the information and may determine a spike in resource utilization within technology layer 220 (e.g., an unexpected increase in an amount of user traffic on a web site), an occurrence of a divergent behavior (e.g., a divergent query behavior in a database), a network packet loss, an overload of processor resources within technology layer 220, Input/Output (I/O) related latency, a failure of a device within technology layer 220, a power outage on a device included within technology layer 220, an occurrence of a denial of service (DOS) attack, etc.

Process 400 may include generating an alert for the event (block 420). For example, technology layer server 230 may generate an alert that includes information related to the occurrence of the event. The information related to the occurrence of the event may include information identifying a type of the event, a time and/or date of the occurrence of the event, an application and/or a process associated with (e.g., adversely affected by) the occurrence of the event, information identifying technology layer 220, information identifying support personnel associated with taking corrective action to address the occurrence of the event, information identifying a consequence of the occurrence of the event (e.g., a failure of a device included in technology layer 220, an occurrence of a divergent query behavior, etc.) and/or other types of information useful for addressing and/or identifying issues related to the occurrence of the event.

Process 400 may include outputting the alert (block 430). For example, technology layer server 230 may output the alert to event server 210. The alert may include information for enabling event server 210 to classify the alert and/or to determine that the alert is related to other alerts received from other technology layer servers 230 associated with other technology layers 220 of the IT system. For example, the alert may include information identifying the technology layer 220 associated with technology layer server 230, information identifying a device, an application, and/or process associated with the occurrence of the event, information identifying the alert as a critical/non-critical alert, information identifying an action taken with respect to the alert (e.g., transmission of a notification to support personnel, storage of the alert in a log file, a corrective action taken to address an issue related to the occurrence of the event, etc.), and/or other types of information for enabling event server 210 to categorize the alert and/or identify related alerts generated within the IT system.

In some implementations, the alert may include a notification that includes information regarding the occurrence of the event. Technology layer server 230 may output the notification to a user via a display device associated with technology layer server 230. The notification may notify the user of the occurrence of the event and/or that the alert has been transmitted to event server 210. In some implementations, the notification may include information for enabling the user to determine any corrective action that may be required to mitigate and/or correct an issue resulting from the occurrence of the event.

Process 400 may include storing the alert (block 440). For example, technology layer server 230 may store information related to the occurrence of the event. In some implementations, technology layer server 230 may store the information related to the occurrence of the event in a central repository associated with the IT system. For example, the IT system may include multiple technology layer servers 230 for monitoring multiple, different technology layers 220. Each of the technology layer servers 230 may generate an alert in response to events occurring within a respective technology layer 220 and may store the generated alert in the central repository. In some implementations, each technology layer server 230 may provide generated alerts to another device (e.g., event server 210) and the other device may store the alerts in the central repository.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks may be omitted in some implementations.

Figure 5:
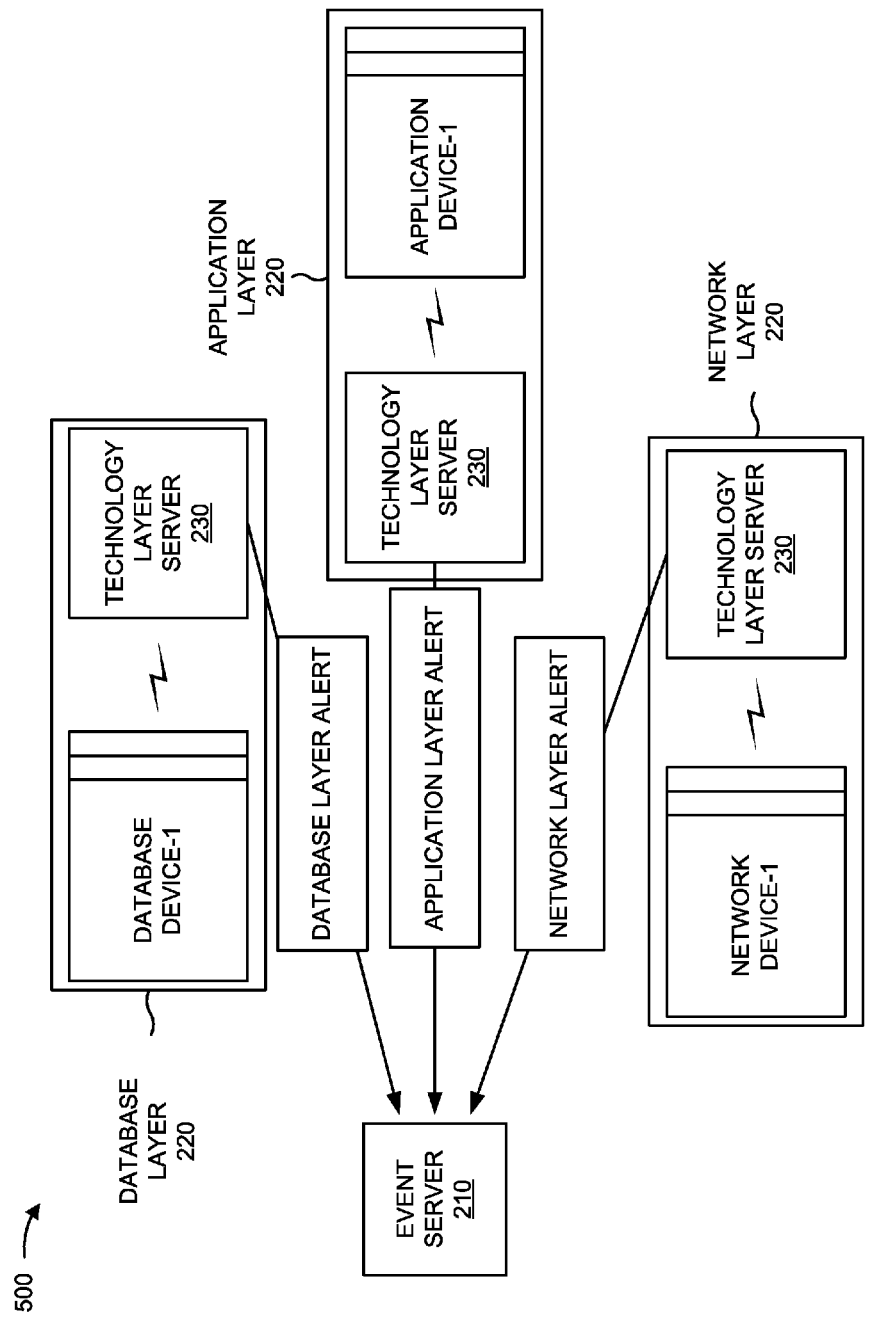
FIG. 5 is a diagram of an example of the process described in connection with FIG. 4.

FIG. 5 is a diagram of an example 500 of process 400 described in connection with FIG. 4. For example 500, assume that an IT system includes three technology layers 220 (e.g., a database layer, an application layer, and a network layer) and that each technology layer 220 includes a technology layer server 230 for monitoring an operation and/or performance of the technology layer 220. Referring now to FIG. 5, the technology layer servers 230 may determine occurrences of events associated with the respective technology layers 220. The technology layer servers 230 may generate alerts for the occurrences of the events and may send the alerts to event server 210. As shown in FIG. 5, a technology layer server 230, included in a database layer of the IT system, sends a database alert to event server 210, a technology layer server 230, included in an application layer of the IT system, sends an application alert to event server 210, and a technology layer server 230, included in a network layer of the IT system, sends a network alert to event server 210. Event server 210 may classify and/or group the received alerts. Event server 210 may publish the categorized and/or grouped alerts in a manner that allows for tracing, in a chronological order, and through the database layer, the application layer, and/or the network layer, a sequence events resulting in a particular alert being generated.

As indicated above, FIG. 5 is provided merely as an example. Other examples are possible and may differ from what was described with regard to FIG. 5.

FIG. 6 is a diagram of an example data structure 600 that may store alert-related data. Data structure 600 may be stored in a memory associated with one or more devices shown in FIG. 2. For example, data structure 600 may be stored by, or associated with, event server 210. In some implementations, data structure 600 may be stored by, or associated with, one or more other devices of FIG. 2.

Data structure 600 may include a collection of fields, such as, for example, a classification field 610, a date/time field 620, a technology layer field 630, and an alert field 640. Classification field 610 may store information identifying a classification determined for an alert. The classification may identify, for example, a process, an application, a device, etc. associated with the alert. In some implementations, classification field 610 may store information identifying multiple classifications determined for the alert. For example, an alert may be associated with a particular application and a particular device. Classification field 610 may store information identifying the particular application and the particular device.

In some implementations, data structure 600 may store the alert-related data in groupings of alerts based on information stored in classification field 610. As shown in FIG. 6, data structure 600 may store alerts classified as being associated with Process1 in a first grouping 612. Data structure 600 may store alerts classified as being associated with Application1 in a second grouping 614. Data structure 600 may store an alert classified as being associated with Device1 in a third grouping 616. The groupings may allow support personnel to quickly identify related alerts regardless of a technology layer 230 by which the alert was generated.

Date/time field 620 may store information identifying a date and/or a time associated with an alert. For example, the information may include a time stamp that indicates a date and a time that the alert is generated by technology layer server 230 and/or received by event server 210. Within a particular grouping of alerts, in some implementations, database 600 may chronologically list alert-related information for each alert included in the grouping based on the information included in Date/Time field 620.

Technology layer field 630 may store information identifying a technology layer 220 having an occurrence of an event for which an alert is generated (e.g., as shown in data structure 600, a network technology layer, an application technology layer, a hardware technology layer, a database technology layer, and a presentation technology layer). For example, a particular technology layer server 230 may be included in a particular technology layer 220. The particular technology layer server 230 may determine an occurrence of an event within the particular technology layer 220 and may generate an alert based on the occurrence of the event. Technology layer field 630 may store information identifying the particular technology layer 220.

Alert field 640 may store information regarding an alert. In some implementations, the information may be related to an occurrence of an event for which the alert is generated (e.g., as shown in data structure 600, a network event, an application event1, an application event2, a hardware event1, a hardware event2, a database event, and a presentation event). For example, the information may identify a power outage, a device failure, a divergent behavior, a spike in user activity, etc. In some implementations, the information may include information identifying an error or undesirable behavior resulting from the occurrence of the event. For example, the information may include an error code associated with a particular type of error and/or a particular type of undesirable behavior that occurred within the technology layer 220 identified in technology layer field 630.

Although FIG. 6 shows example fields of data structure 600, in some implementations, data structure 600 may include additional fields, different fields, or fewer fields than those depicted in FIG. 6.

Figure 7A:
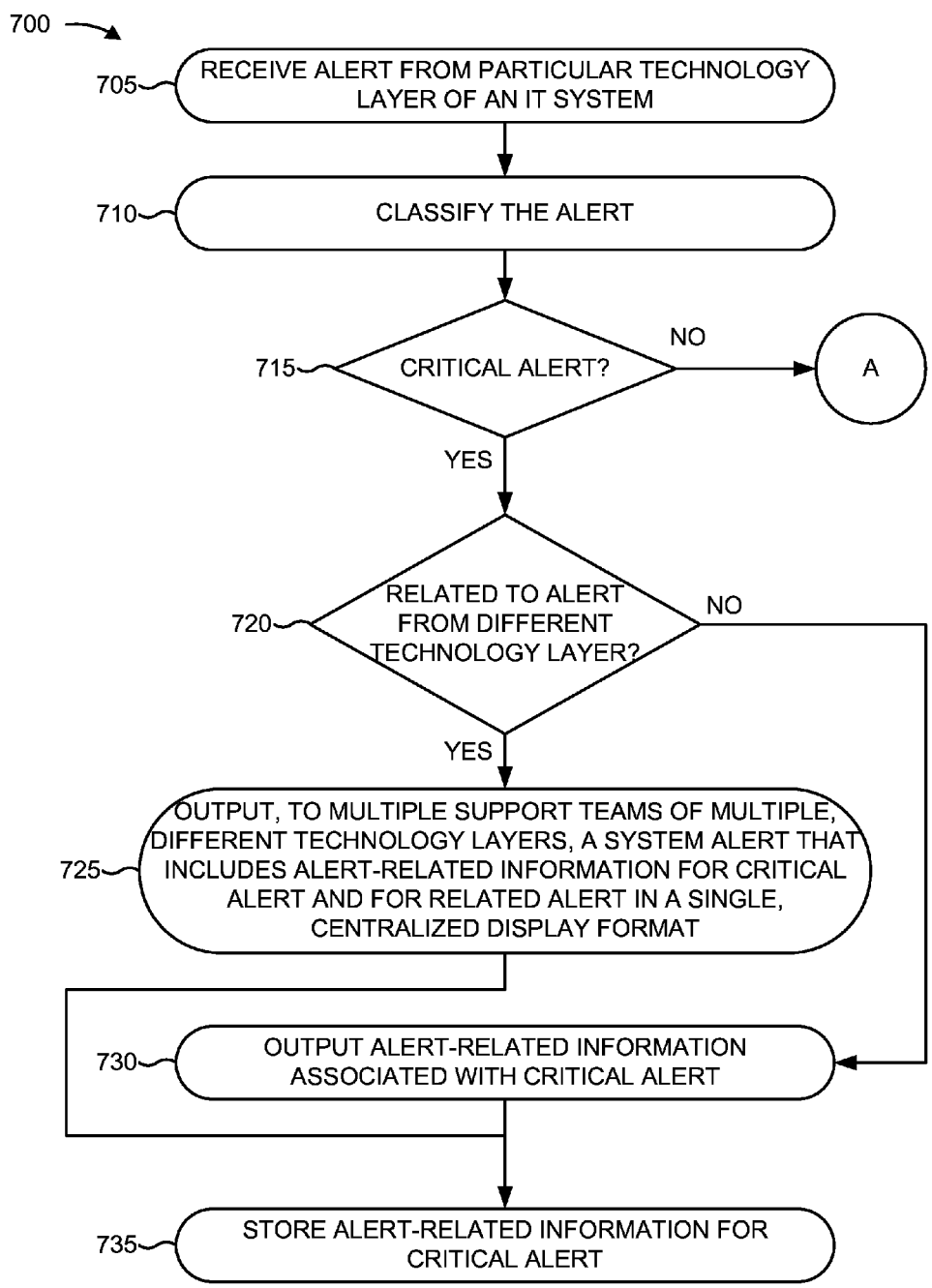
FIGS. 7A and 7B are a flow chart of an example process for providing alert-related information.
Figure 7B:
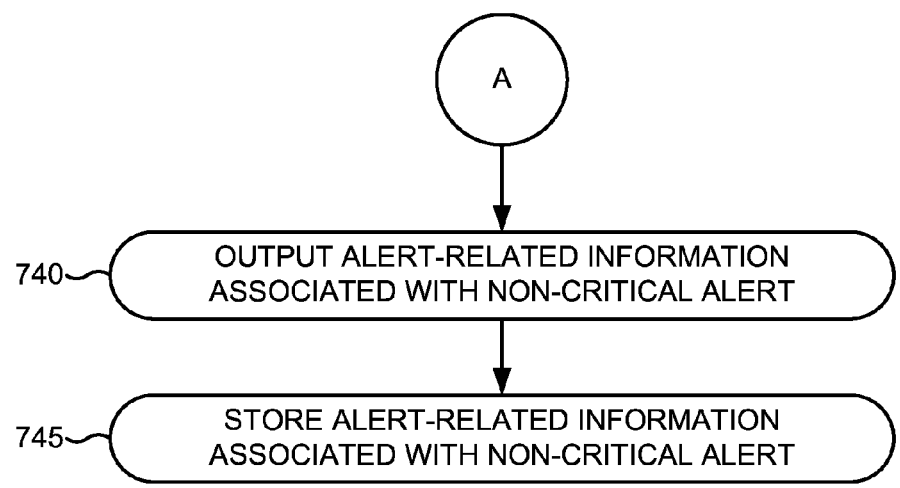

FIGS. 7A and 7B are a flow chart of a process 700 for providing alert-related information according to one or more implementations described herein. In some implementations, process 700 may be performed by event server 210. In some implementations, process 700 may be performed by one or more other devices instead of, or possibly in conjunction with, event server 210.

Process 700 may include receiving an alert from a particular technology layer of an IT system (block 705, FIG. 7A). For example, technology layer server 230 may be included in a particular technology layer 220. Technology layer server 230 may detect an occurrence of an event associated with the particular technology layer 220. Technology layer server 230 may generate an alert for the occurrence of the event. Technology layer server 230 may send the alert to event server 210 and event server 210 may receive the alert via network 240.

Process 700 may include classifying the alert (block 710). For example, the alert may include information identifying a process associated with the occurrence of the event. Event server 210 may analyze the alert to determine the process. Event server 210 may identify an application invoking the process and may classify the alert as being related to the application. In some implementations, the alert may be associated with multiple classifications. For example, the application may be executed by a processor of a particular device included within technology layer 220. The application may invoke the process via a function call transmitted to another, different device included in technology layer 220 and the other device may execute the process. Event server 210 may classify the alert as being related to the application, the processor of the particular device, the particular device, the function call, the other device, and/or the process.

Process 700 may include determining whether the alert is a critical alert (block 715). For example, event server 210 may determine whether the alert is a critical alert or a non-critical alert. In some implementations, event server 210 may determine whether the alert is a critical alert or a non-critical alert based on information included in the alert. For example, the technology layer generating the alert (e.g., technology event server 230) may determine whether the alert is a critical alert or a non-critical alert and may include information identifying the alert as critical or non-critical in a header of the alert. Event server 210 may receive the alert and may parse the header to determine whether the alert is a critical alert or a non-critical alert.

In some implementations, event server 210 may determine whether the alert is a critical alert or a non-critical alert based on particular criteria associated with the alert. For example, each technology layer 220 may determine particular criteria and/or rules for determining whether an alert is a critical alert or a non-critical alert. Event server 210 may obtain information and/or criteria for determining whether the alert is a critical alert or a non-critical alert from the technology layer server 230 generating the alert.

In some implementations, the criteria for determining whether the alert is a critical alert or a non-critical alert may depend upon a time at which the event for which the alert was generated occurred. For example, a particular technology layer 220 may include a multiple devices for providing a particular web application. A failure of one of the devices used to provide the particular web application may be a critical alert during a time of day associated with a high volume of user traffic to a web site hosting the web application and may be a non-critical alert during a time of day associated with a time of day associated with a low volume of user traffic to the web site.

Event server 210 may determine whether the alert is a critical alert based on the criteria. In some implementations, the criteria may include information indicating types of events associated with critical alerts. For example, the criteria may indicate that an alert associated with a failure of a device, a power outage, a disruption of a service, a particular divergent behavior, etc. should be determined to be a critical alert. Event server 210 may determine that the alert is a critical alert when the alert was generated in response to a type of event indicated in the criteria. Additionally, or alternatively, event server 210 may determine whether the alert is a critical alert or a non-critical alert another way and/or based on other types of criteria.

In those instances where the alert is a critical alert (block 715—YES), process 700 may include determining whether the critical alert is related to an alert from a different technology layer (block 720). For example, event server 210 may access one or more data structures (e.g., data structure 600) storing alert-related information. Event server 210 may determine whether the critical alert is related to one or more alerts generated by a technology layer server 230 included in a technology layer 220 that is different from the particular technology layer 220 from which the critical alert was received. In some implementations, event server 210 may store a data structure for each classification that may be determined for an alert. Event server 210 may analyze the alert to determine a device, an application, a process, etc. associated with the alert. Event server 210 may determine a particular classification for the alert based on the alert being associated with the device, the application, the process, etc. Event server 210 may access a data structure storing alert-related information for alerts having the particular classification. The data structure may store information identifying a technology layer 220 from which each alert having the particular classification was received. Event server 210 may analyze the information to determine whether the data structure includes alert-related information for an alert that was received from a technology layer 220 that is different from the technology layer 220 from which the critical alert was received.

In some implementations, event server 210 may filter information stored in the data structure to determine whether the critical alert is associated with one or more alerts generated by a different technology layer 220. For example, the data structure may store, for each alert, information identifying the classification determined for the alerts. Event server 210 may filter the stored information to obtain alert-related information for only those alerts having a classification that is the same as the classification determined for the critical alert. Event server 210 may analyze the obtained alert-related information to determine whether any of the alerts, having the same classification as the critical alert, were generated by a technology layer server 230 that is included in a technology layer 220 that is different from the particular technology layer 220 from which the critical alert was received. Event server 210 may determine that the critical alert is related to an alert from a different technology layer 220 when the data structure includes alert-related information for an alert having the same classification as the critical alert and is received from a technology layer 220 that is different from the particular technology layer 220 from which the critical alert was received.

In those instances where the critical alert is related to an alert from a different technology layer (block 720—YES), process 700 may include outputting, to multiple support teams of multiple, different technology layers, a system alert that includes alert-related information for the critical alert and for the related alert in a single, centralized display format (block 725). For example, event server 210 may generate a system alert that includes alert-related information associated with the critical alert and alert-related information associated with each of the one or more related alerts. In some implementations, the alert-related information may include information identifying a time and/or date that the critical alert was generated, information identifying a classification determined for the critical alert, information identifying the different technology layers 220 from which the one or more related alerts were received, information indicating whether there were related alerts received from the particular technology layer 220, information regarding the occurrence of the event for which the alert was generated, information identifying a time and/or a date of the one or more related alerts, information identifying a classification of the one or more related alerts, and/or other types of information for enabling support personnel to determine and/or implement corrective action relating to the critical alert.

In some implementations, event server 210 may identify one or more related alerts that were received from the particular technology layer 220. The system alert may include alert-related information associated with the one or more related alerts received from the particular technology layer 220. In some implementations, the system alert may include a chronological listing of the critical alert and each related alert. For example, event server 210 may determine a time at which the critical alert and each related alert were generated by respective technology layer servers 230. The system alert may list the critical alert and each related alert based on an order that the alerts were generated (e.g., an alert generated prior to another alert being listed prior to the other alert in the chronological listing). Additionally, or alternatively, the system alert may sort the critical alert and the one or more alerts based on a criticality of the critical alert and/or the one or more related alerts. For example, the system alert may include a listing of alerts. In the listing of alerts, critical alerts may be listed prior to non-critical alerts. For example, the critical alert resulting in the system alert being generated may be the first alert listed in the listing of alerts. Each non-critical alert may be included in a reverse chronological order based on a time the non-critical alert was received by event server 210 and/or a time at which the non-critical alert was generated by technology layer server 230.

Event server 210 may output the system alert to the particular technology layer 220 (e.g., to support personnel associated with the particular technology layer 220) from which the critical alert was received and to each of the different technology layers 220 (e.g., to support personnel associated with each of the different technology layers 220) from which the one or more related alerts were received. The particular technology layer 220 and each of the different technology layers 220 may receive the system alert and may provide the system alert to respective support teams associated with the technology layers 220. The system alert may allow each of the support teams to trace a sequence of events that resulted in the occurrence of the event for which the critical alert was generated irrespective of the technology layers 220 in which the events originated. Based on tracing the sequence of events, each of the supports teams may identify a root cause (e.g., an event initiating the occurrence of the sequence of events) of the critical alert. Based on the root cause, each of the support teams may efficiently determine and/or implement appropriate corrective action for correcting/mitigating circumstances related to the critical alert.

In those instances where the critical alert is not related to an alert from a different technology layer (block 720—NO), process 700 may include outputting alert-related information associated with the critical alert (block 730). For example, event server 210 may output a system alert to the particular technology layer 220 (e.g., to support personnel associated with the particular technology layer 220) from which the critical alert was received. The system alert may include alert-related information associated with the critical alert. In some implementations, the alert-related information may include information identifying a time and/or date that the critical alert was generated, information identifying a classification determined for the critical alert, information indicating that there were no related alerts received from different technology layers 220, information indicating whether there were related alerts received from the particular technology layer 220, information regarding the occurrence of the event for which the alert was generated, and/or other types of information for enabling support personnel to determine and/or implement corrective action relating to the critical alert.

In some implementations, event server 210 may identify one or more related alerts that were received from the particular technology layer 220. Event server 210 may output alert-related information associated with the one or more related alerts received from the particular technology layer 220 to the particular technology layer 220 in conjunction with the alert-related information.

In those instances where the critical alert is not related to an alert from a different technology layer 220 and in those instances where a system alert is output, process 700 may include storing alert-related information for the critical alert (block 735). For example, event server 210 may store information associated with the critical alert and/or the occurrence of the event for which the critical alert was generated in a data structure. In some implementations, the data structure may include data structure 600.

In those instances where the alert is not a critical alert (block 715—NO), process 700 may include outputting alert-related information associated with the non-critical alert (block 740, FIG. 7B) and storing alert-related information associated with the non-critical alert (block 745). For example, event server 210 may forward the non-critical alert to the particular technology layer 220 (e.g., to support personnel associated with the particular technology layer 220). Event server 210 may store the alert and/or alert-related information associated with the alert in a data structure. In some implementations, event server 210 may store the alert and/or the alert-related information in data structure 600.

Although FIGS. 7A and 7B show example blocks of process 700, in some implementations, process 700 may include additional blocks, different blocks, fewer blocks, or differently arranged blocks than those depicted in FIG. 7. Additionally, or alternatively, one or more of the blocks of process 700 may be performed in parallel. Further, one or more blocks may be omitted in some implementations.

Figure 8A:
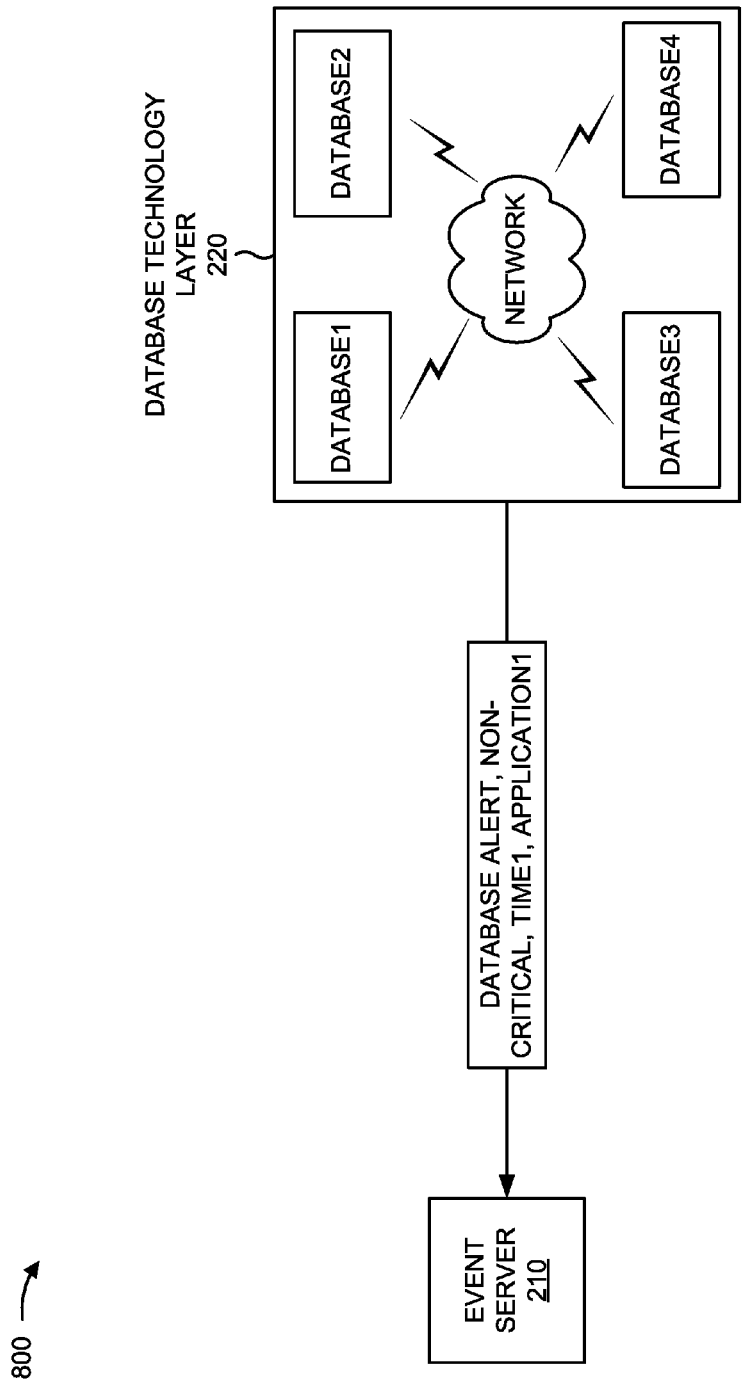
FIGS. 8A-8D are diagrams of an example of the process described in connection with FIGS. 7A and 7B.

FIGS. 8A-8D are diagrams of an example 800 of process 700 described in connection with FIGS. 7A and 7B. For example 800, assume that a technology layer 220 ("Database Technology Layer") determines an occurrence of an event at a particular time ("Time1") and generates an alert ("Alert1"). Further, assume that the Alert1 is a non-critical alert and is associated with a particular application ("Application1"). Referring to FIG. 8A, Database Technology Layer may forward the Alert1 to event server 210. Event server 210 may receive the Alert1 and may determine that the Alert1 is a non-critical alert associated with the Application1.

Figure 8B:
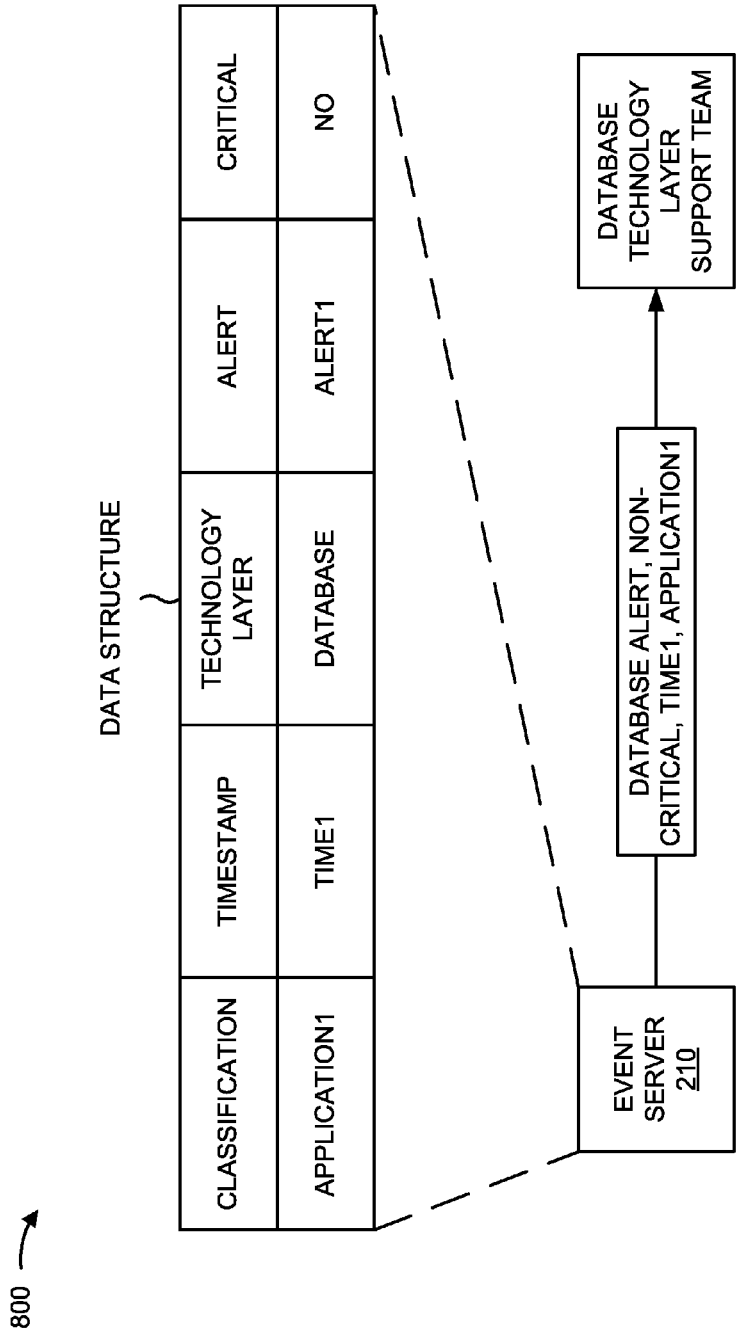

Referring to FIG. 8B, event server 210 may store alert-related information for the Alert1 in a data structure and may forward the Alert1 to a support team associated with the Database Technology Layer. In some implementations, non-critical alerts may be sent to associated support teams periodically while critical alerts may be sent to associated support teams in response to the critical alert being received by event server 210. For example, once a day, week, month, etc., event server 210 may generate a report that includes all of the non-critical alerts received by event server 210 that day, week, month, etc. In some implementations, event server 210 may not send a non-critical alert to the associated support team. For example, the technology layer server 230 may store a copy of the non-critical alert in a log file that is periodically reviewed by support team personnel.

Figure 8C:
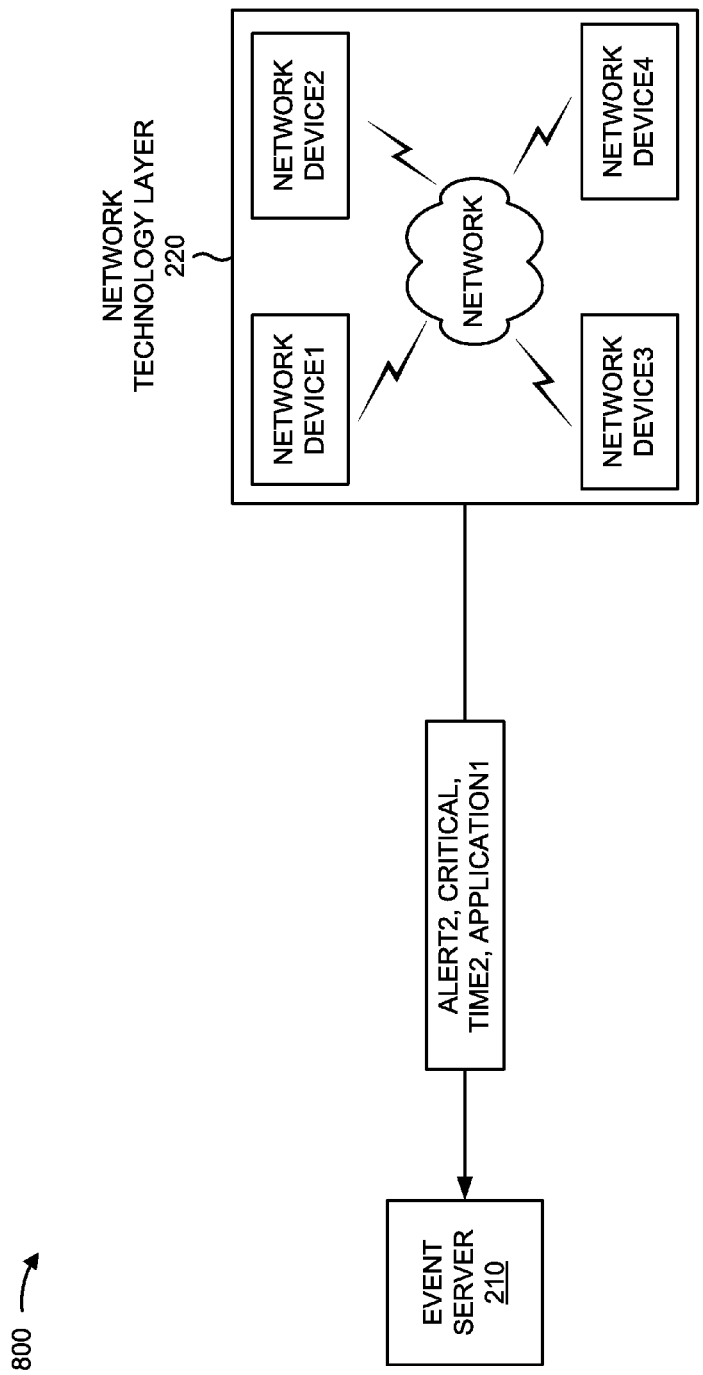

For FIG. 8C, assume that a different technology layer 220 ("Network Technology Layer") detects an occurrence of an event and generates an alert ("Alert2"). Further, assume that the Alert2 is a critical alert and is associated with the Application1. Referring to FIG. 8C, Network Technology Layer may forward the Alert2 to event server 210. Event server 210 may receive the Alert2 and may determine that the Alert2 is a critical alert associated with the Application1.

Figure 8D:
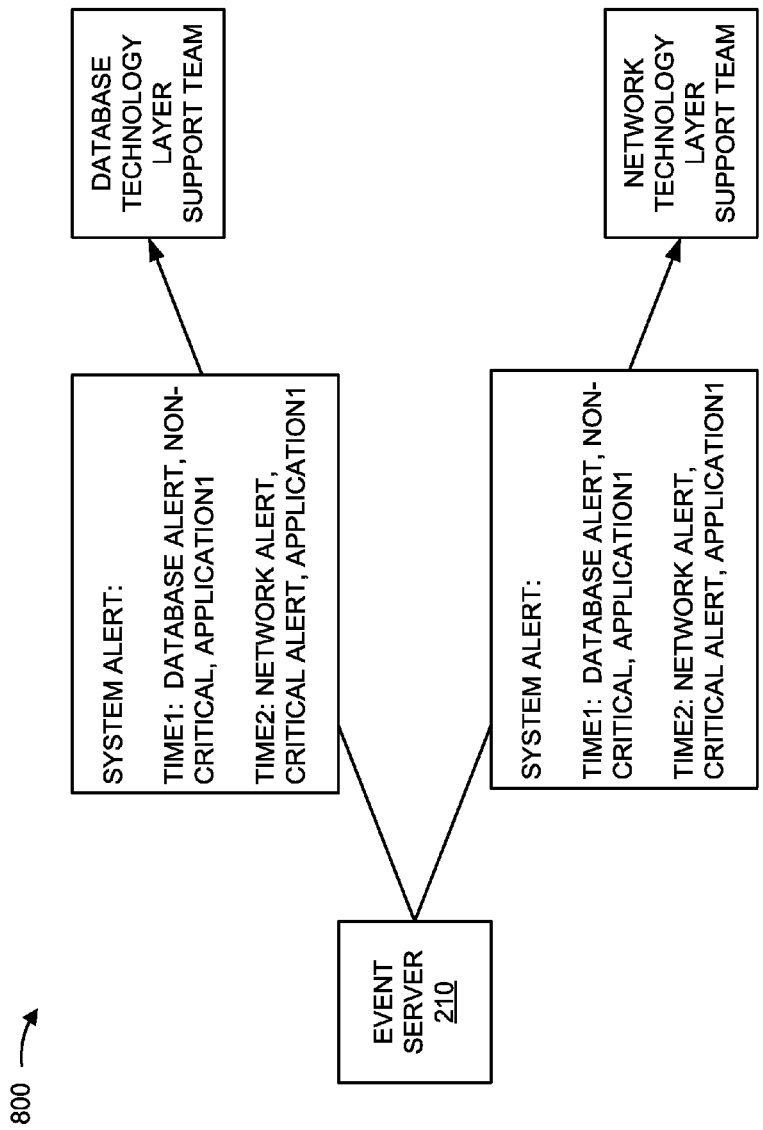

For FIG. 8D, assume that based on the Alert2 being a critical alert, event server 210 accesses the data structure and identifies the Alert1 as being related to the Alert2 and generates a system alert that includes alert-related information for the Alert1 and the Alert2. Referring to FIG. 8D, event server 210 may forward the system alert to a support team associated with the Database Technology Layer and to a support team associated with the Network Technology Layer. As shown in FIG. 8D, the system alert includes a chronological listing of the critical alert (Alert2) and the related alert (Alert1). The system alert may allow the support team associated with the Database Technology Layer and the support team associated with the Network Technology Layer to work together to trouble-shoot and/or resolve any issues relating to the Alert1 and the Alert2.

As indicated above, FIGS. 8A-8D are provided merely as an example. Other examples are possible and may differ from what was described with regard to FIGS. 8A-8D.

The foregoing description provides illustration and description, but is not intended to be exhaustive or to limit the implementations to the precise form disclosed. Modifications and variations are possible in light of the above disclosure or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a device, a first alert from a first technology layer of an information technology system,
      the first alert being associated with an occurrence of a first event within the first technology layer, and
      the first technology layer being a database layer;
   receiving, by the device, a second alert from a second technology layer of the information technology system,
      the second alert being associated with an occurrence of a second event within the second technology layer,
      the second technology layer being an application layer or a network layer, and
      the second technology layer being different from the first technology layer;
   determining, by the device, that the first alert is related to the second alert;
   generating, by the device and based on determining that the first alert is related to the second alert, a third alert that includes information associated with the first alert and information associated with the second alert; and
   providing, by the device, the third alert to at least one of the first technology layer or the second technology layer.

2. The method of claim 1, further comprising:
   classifying the first alert based on the first alert being associated with at least one of:
      a particular device,
      a particular process, or
      a particular application; and classifying the second alert based on the second alert being associated with at least one of:
the particular device,
the particular process, or
the particular application,
where determining that the first alert is related to the second alert includes:
determining that the first alert is related to the second alert based on classifying the first alert and classifying the second alert.

3. The method of claim 2, wherein determining that the first alert is related to the second alert includes:
determining that the first alert and the second alert have a same classification, and
determining that the first alert is related to the second alert based on the first alert and the second alert having the same classification.

4. The method of claim 1, wherein determining that the first alert is related to the second alert includes:
forming a group of alerts associated with the at least one of:
a particular device,
a particular process, or
a particular application,
determining that the first alert and the second alert are included in the group of alerts, and
determining that the first alert is related to the second alert based on the first alert and the second alert being included in the group of alerts.

5. The method of claim 1, wherein generating the third alert includes:
determining that the first alert was generated at a first time,
determining that the second alert was generated at a second time,
the second time being subsequent to the first time, and
generating the third alert as a chronological listing of alerts that includes the first alert and the second alert,
the first alert being listed in the chronological listing of alerts prior to the second alert based on the second time being subsequent to the first time.

6. The method of claim 1, further comprising:
receiving a fourth alert,
the fourth alert being related to the second alert,
where generating the third alert includes:
determining that the fourth alert is related to the second alert,
determining whether the fourth alert is received from the second technology layer, and
selectively including, in the third alert, information associated with the fourth alert based on whether the fourth alert is received from the second technology layer,
the information associated with the fourth alert being included in the third alert when the fourth alert is not received from the second technology layer, and
the information associated with the fourth alert being omitted from the third alert when the fourth alert is received from the second technology layer.

7. The method of claim 1, further comprising:
determining a sequence of events based on the information associated with the first alert and the information associated with the second alert,
the sequence of events including the first event and the second event; and
determining that the occurrence of the second event results from the occurrence of the first event based on the sequence of events.

8. A device comprising:
a processor to:
receive a first alert from a first technology layer of an information technology system,
the first alert being associated with an occurrence of a first event within the first technology layer, and
the first technology layer being an application layer;
receive a second alert from a second technology layer of the information technology system,
the second alert being associated with an occurrence of a second event within the second technology layer,
the second technology layer being a database layer or a network layer, and
the second technology layer being different from the first technology layer;
determine that the first alert is related to the second alert;
generate, based on the first alert being related to the second alert, a system alert that includes:
alert-related information associated with the first alert, and
alert-related information associated with the second alert; and
provide the system alert to one or more of the first technology layer or the second technology layer.

9. The device of claim 8, where the processor is further to:
determine a classification for the first alert based on the first alert being associated with one or more of:
a particular device,
a particular process, or
a particular application; and
determine a classification for the second alert based on the first alert being associated with one or more of:
the particular device,
the particular process, or
the particular application,
where, when determining that the first alert is related to the second alert, the processor is to:
determine that the first alert is related to the second alert based on the classification for the first alert and the classification for the second alert.

10. The device of claim 8, where, when determining that the first alert is related to the second alert, the processor is to:
determine that the first alert and the second alert are associated with a particular classification, and
determine that the first alert is related to the second alert based on the first alert and the second alert being associated with the particular classification.

11. The device of claim 8, where, when determining that the first alert is related to the second alert, the processor is to:
determine that the first alert is associated with one or more of:
a particular device,
a particular process, or
a particular application,
determine that the second alert is associated with the one or more of the particular device, the particular process, or the particular application,
form a group of alerts associated with the one or more of the particular device, the particular process, or the particular application,
determine that the first alert and the second alert are included in the group of alerts, and determine that the first alert is related to the second alert based on the first alert and the second alert being included in the group of alerts.

12. The device of claim 8, where, when generating the system alert, the processor is to:
   determine a time at which the first alert was generated,
   determine a time at which the second alert was generated, and
   generate, based on the time at which the first alert was generated and the time at which the second alert was generated, the system alert as a chronological listing of alerts,
      the chronological listing of alerts including the first alert and the second alert.

13. The device of claim 8,
where the processor is further to:
   receive a fourth alert,
      the fourth alert being related to the second alert; and
where, when generating the system alert, the processor is to:
   determine that the fourth alert is related to the second alert,
   determine whether the fourth alert is received from the second technology layer, and
   selectively include, in the system alert, alert-related information associated with the fourth alert based on whether the fourth alert is received from the second technology layer,
      the system alert including the alert-related information associated with the fourth alert when the fourth alert is not received from the second technology layer, and
      the system alert omitting the alert-related information associated with the fourth alert when the fourth alert is received from the second technology layer.

14. The device of claim 8, where the processor is further to:
   determine a sequence of events based on the alert-related information associated with the first alert and the alert-related information associated with the second alert,
      the sequence events including the first event and the second event; and
   determine, based on the sequence of events, that the occurrence of the second event results from the occurrence of the first event.

15. A non-transitory computer-readable medium storing instructions, the instructions comprising:
   one or more instructions that, when executed by one or more processors, cause the one or more processors to:
      receive a first alert associated with an occurrence of a first event,
         the first event occurring within a first technology layer of an information technology system, and
         the first technology layer being an application layer or a database layer;
      receive a second alert from a second technology layer of the information technology system,
         the second alert being associated with an occurrence of a second event within the second technology layer, and
         the second technology layer being a network layer;
      determine that the first alert is related to the second alert;
      generate, based on the first alert being related to the second alert, a system alert that includes:
         alert-related information associated with the first alert, and
         alert-related information associated with the second alert;
      and
      provide the system alert to at least one of the first technology layer or the second technology layer.

16. The non-transitory computer-readable medium of claim 15, where the instructions further comprise:
   one or more instructions that, when executed by the one or more processors, cause the one or more processors to:
      determine a classification for the first alert based on the first alert being associated with:
         a particular device,
         a particular process, or
         a particular application; and
      determine a classification for the second alert based on the second alert being associated with:
         the particular device,
         the particular process, or
         the particular application; and
   where the one or more instructions to determine that the first alert is related to the second alert include:
      one or more instructions that, when executed by the one or more processors, cause the one or more processors to:
         determine that the first alert is related to the second alert based on the classification for the first alert and the classification for the second alert.

17. The non-transitory computer-readable medium of claim 15, where the one or more instructions to determine that the first alert is related to the second alert include:
   one or more instructions that, when executed by the one or more processors, cause the one or more processors to:
      determine that the first alert and the second alert are associated with a particular classification, and
      determine that the first alert is related to the second alert based on the first alert and the second alert being associated with the particular classification.

18. The non-transitory computer-readable medium of claim 15, where the one or more instructions to determine that the first alert is related to the second alert include:
   one or more instructions that, when executed by the one or more processors, cause the one or more processors to:
      determine that the first alert is associated with a particular application provided by the information technology system,
      determine that the second alert is associated with the particular application,
      form a group of alerts associated with the particular application,
         the first alert and the second alert being included in the group of alerts, and
      determine that the first alert is related to the second alert based on the first alert and the second alert being included in the group of alerts.

19. The non-transitory computer-readable medium of claim 15, where the one or more instructions to generate the system alert include:
   one or more instructions that, when executed by the one or more processors, cause the one or more processors to:
      determine a time at which the first alert was generated,
      determine a time at which the second alert was generated,
      generate, based on the time at which the first alert was generated and the time at which the second alert was generated, a chronological listing of alerts, and
      generate the system alert based on the chronological listing of alerts,
         the chronological listing of alerts including the first alert and the second alert.

20. The non-transitory computer-readable medium of claim 15, where the instructions further comprise:
  one or more instructions that, when executed by the one or more processors, cause the one or more processors to:
    determine a sequence of events based on the alert-related information associated with the first alert and the alert-related information associated with the second alert; and
    determine, based on the sequence of events, that the first event is a root cause of the second event.

* * * * *